Sept. 18, 1962  J. O. REXROAD  3,054,866
ENCLOSED CIRCUIT INTERRUPTER
Filed March 4, 1959  4 Sheets-Sheet 2

INVENTOR
James O. Rexroad
BY
ATTORNEY

Sept. 18, 1962 J. O. REXROAD 3,054,866
ENCLOSED CIRCUIT INTERRUPTER
Filed March 4, 1959 4 Sheets-Sheet 4

United States Patent Office 3,054,866
Patented Sept. 18, 1962

1

3,054,866
ENCLOSED CIRCUIT INTERRUPTER
James O. Rexroad, Beaver, Pa., assignor to Westinghouse Electric Corporation, East Pittsburgh, Pa., a corporation of Pennsylvania
Filed Mar. 4, 1959, Ser. No. 797,131
16 Claims. (Cl. 200—50)

This invention relates, generally, to circuit interrupters and, more particularly, to circuit interrupters, such as automatic circuit breakers and manually operable switches, which may be mounted inside enclosing cabinets having an operating handle mounted on the outside of the cabinet.

Heretofore, the operating handles for enclosed circuit breakers and combination line starters with circuit breakers or disconnect switches have usually been mounted on the front of the cover for the enclosing cabinet. The external operating handle was also utilized as a cover opening handle. Mechanical interlocking was provided that normally required the breaker on disconnect switch to be in the "off'" or "open cover'" position to release the cover for opening. Frequently, provision was made for releasing the cover by the use of a tool, such as a screwdriver, when the breaker or disconnect switch was in the "on" position. With the cover open the external operating handle and the breaker or disconnect switch were disengaged from each other. Operating conditions in certain modern industrial plants make it desirable to provide additional safety features on enclosed circuit interrupters.

An object of the invention is to provide an enclosed circuit interrupter having an external operating handle mechanically attached to the circuit interrupter at all times.

Another object of the invention is to provide an enclosed circuit interrupter having a cover which must be completely closed or sealed against a gasket by a latching mechanism before the interrupter can be closed.

A further object of the invention is to provide for locking the circuit interrupter in the "off" position with the door open.

Still another object of the invention is to provide for easily and safely closing the circuit interrupter with the door open by deliberately voiding the interlocking.

A still further object of the invention is to make it necessary to utilize a tool other than the door closing handle to open the door.

Yet another object of the invention is to prevent opening of the door when the interrupter is in the "on" position.

Another object of the invention is to provide for locking the cover handle in the closed cover position to prevent opening the cover.

Other objects of the invention will be explained fully hereinafter or will be apparent to those skilled in the art.

In accordance with one embodiment of the invention the external operating handle for an enclosed circuit interrupter is front mounted on a fixed portion of the cabinet and is continuously connected to the interrupter regardless of the cabinet cover position. Mechanical interlocking prevents operation of the interrupter to the "on" position unless the cover is fully closed by a latching mechanism, except that the interlocking means can be deliberately voided when the cover is open. A separate tool is required to open the cover and an interlock prevents opening the cover when the interrupter is in the "on" position.

For a better understanding of the nature and objects of the invention, reference may be had to the following detailed description, taken in conjunction with the accompanying drawing, in which.

Figure 1:
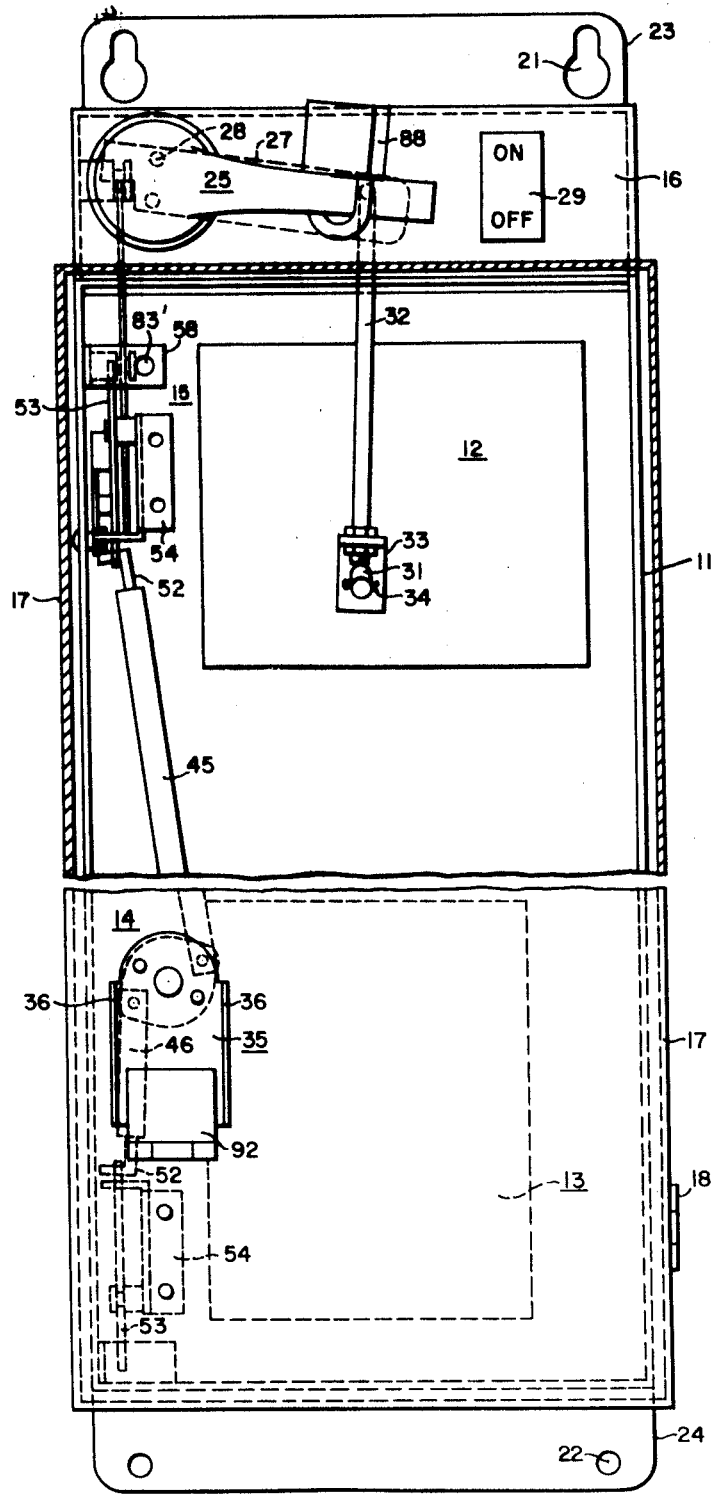
FIGURE 1 is a view, partly in front elevation and partly in section, of a cabinet and mechanism for operating a circuit interrupter mounted inside the cabinet.
Figure 2:
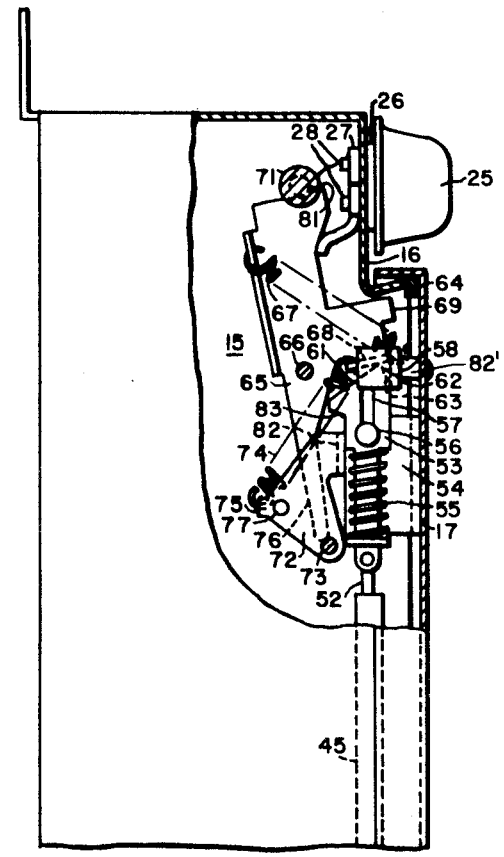
FIG. 2 is a view, partly in side elevation and partly in section, of the structure shown in FIG. 1.

Referring to the drawings, and particularly to FIGS. 1 and 2, the structure shown therein comprises a sheet metal cabinet 11 of dust-tight or liquid-tight construction inside of which a circuit interrupter 12, a motor starter 13, a cover latching mechanism 14 and an interlocking mechanism 15 are mounted. As shown, the front wall of the cabinet 11 comprises a fixed portion 16 and an openable cover 17. The fixed portion 16 of the front wall may be formed as an integral part of the cabinet 11. The cover or door 17 may be hinged to the cabinet by means of a plurality of hinges 18, only one of which is shown. The cabinet 11 may be mounted on a vertical panel or other supporting member by means of openings 21 and 22 provided in extensions 23 and 24, respectively, of the back wall of the cabinet. The use of the extensions makes it unnecessary to have holes inside of the cabinet through which dust or liquid might enter.

An external operating handle 25 is rotatably mounted on the fixed portion 16 of the front wall of the cabinet. The handle 25 may be similar to the one described in Patent No. 2,806,099, issued September 10, 1957 to J. O. Rexroad. The handle has a short shaft or projection which extends through an opening in the bottom of a cup-shaped member 26 which is attached to the portion 16 of the cabinet. An operating lever 27 is attached to the inner end of the projection on the handle by means of screws 28. An indicating plate 29 containing the words "on" and "off" is attached to the fixed portion 16 to indicate whether the circuit interrupter 12 is closed or open.

The circuit interrupter 12 may be a manually operable switch of the type described in Patent 2,849,572, issued August 26, 1958 to A. R. Cellerini et al. As described in the aforesaid patent, the contact members of the switch are opened and closed by a toggle mechanism which is actuated by an oscillating operating member 31.

If desired, the circuit interrupter 12 may be a circuit breaker of the type described in Patent No. 2,047,739, issued July 14, 1936 to H. J. Lingal. The contact members of the circuit breaker may be manually opened and closed by oscillatory movement of an operating member. The circuit breaker may be provided with a tripping mechanism which is operable in response to predetermined overload currents to effect automatic opening of the contact members.

As shown in FIG. 1, the external operating handle 25 is continuously connected to the operating member 31 of the circuit interrupter 12 at all times regardless of the position of the cover 17 of the cabinet. As shown, one end of a connecting link or rod 32 is attached to the operating lever 27. The other end of the rod 32 is attached to an angle-shaped operator or clip 33. One end of the operating member 31 of the interrupter 12 extends through one leg of the operator 33 and is attached by means of a pin 34. Thus, the operating handle 25 is continuously connected to the operating member 31 of the interrupter 12, so that it is impossible to move the interrupter operating member if the external handle 25 is locked, even though the door 17 may be open.

Figure 3:
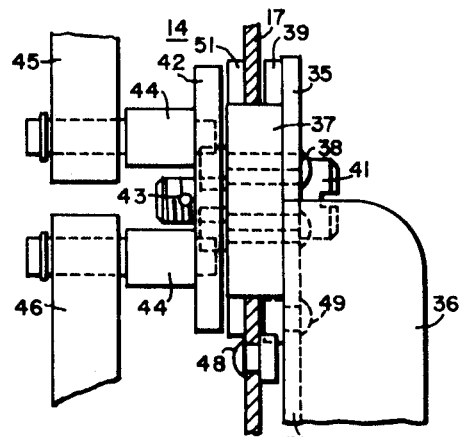
FIGS. 3 and 4 are enlarged detail views, in side and front elevation, respectively, of part of the cover latching mechanism.

The latching mechanism 14 is provided to force the door or cover 17 to the fully-closed and sealed position, and the interlocking mechanism 15 cooperates with the latching mechanism to insure that the interrupter can normally be closed only when the cover is in the fully-closed position. The cover 17 is shown in the fully-closed and sealed position in FIG. 2. As shown most clearly in FIG. 3, the latching mechanism 14 comprises a cover-closing handle 35 having upturned sides 36. The handle 35 is attached to a bushing 37 by means of rivets 38. The bushing 37 is rotatably mounted in the cover 17. A spacer 39 is disposed around the bushing 37 between the handle 35 and the cover 17. A special screw 41 extends through openings in the handle 35 and the bushing 37 and is threaded into an actuating plate 42 disposed inside the cover 17. A pin 43 is inserted through the inner end of the screw 41 to prevent it from being removed from the plate 42. Two spaced pins 44 are riveted to the actuating plate 42. One end of a connector 45 is attached to the upper pin 44. One end of another connector 46 is attached to the lower pin 44.

Figure 4:
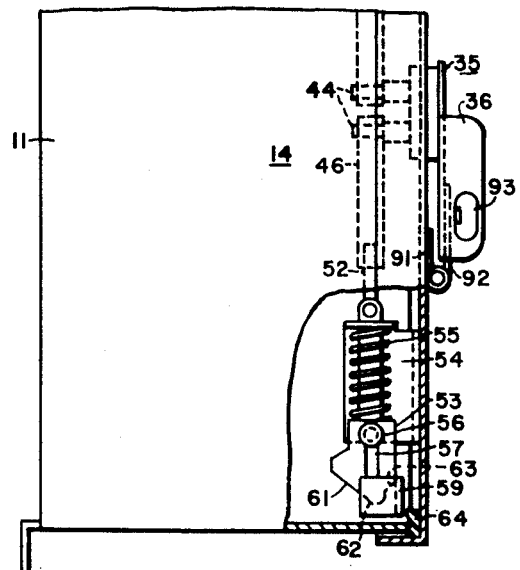
Figure 4:
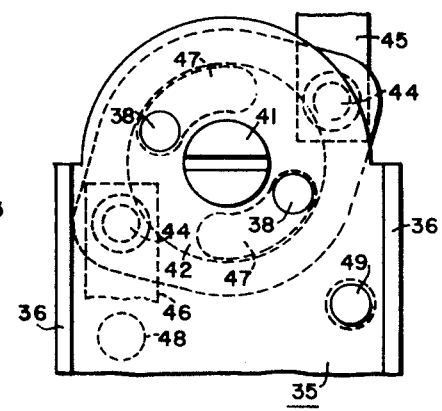

As shown most clearly in FIG. 4, the head or inner end of each one of the rivets 38 is disposed in a curved slot 47 in the plate 42. In this manner a lost motion connection is provided between the cover-sealing handle 35 and the actuating plate 42. Thus, the handle 35 will drive the actuating plate 42 to the closed-cover position and the actuating plate will drive the handle to the open-cover position, but the handle can be in the open-cover position while the actuating plate is in the closed-cover position. Stop pins or rivets 48 and 49, located in the cover 17 and the handle 35, respectively, prevent the handle from going past the open-cover position. Therefore, it is necessary to open the cover by rotating the special screw 41 which threads into the actuating plate 42 and will rotate it to the open-cover position. The screw 41 may be driven by means of a screwdriver or other suitable tool. Thus, a tool separate from the cover closing handle 35 is required to open the cover. The spacer 39 and a spacing washer 51 permit the plate 42 to be rotated easily by means of the screw 41.

As shown in FIGS. 1 and 2, the upper end of the connector 45 is attached to a rod 52 which, in turn, is attached to a cover latch 53 slidably disposed in a bracket 54 attached to the cover 17. Likewise, the lower end of the connector 46 is attached to another rod 52 which is attached to another cover latch 53 slidably disposed in another bracket 54. Thus, the cover latches are moved in opposite directions when the actuating plate 42 is rotated in the manner hereinbefore described. A compression spring 55 is disposed on each latch between a shoulder on the latch and a portion of the bracket 54 to bias the latches toward the cover-closing position. The movement of each latch is limited by a pin 56 disposed in a slot 57.

As shown, a bracket 58 is attached to one side wall of the cabinet 11 to be engaged by the upper latch 53. Likewise, a similar bracket 59 is attached to the cabinet to be engaged by the lower latch 53. Each latch has a sloping surface 61 which engages one leg of one of the brackets 58 or 59 as the cover is being closed, thereby compressing the springs 55. When a nose 62 on each latch passes underneath the leg of its bracket a sloping or cam surface 63 engages the leg of the bracket. The cover 17 may then be forced or cammed to the fully-closed and sealed position shown in FIG. 2 by rotating the cover-closing handle 35 to force the latches 53 underneath the legs of the brackets, thereby compressing a gasket 64 and sealing the cover to the cabinet against the entrance of extraneous matter such as dust, liquid or gases. It will be noted that the compression springs 55 aid in forcing the cover latches underneath the brackets 58 and 59. As previously explained, the latches 53 can not be released by means of the handle 35, but they must be released by means of the screw 41 to let up the pressure on the gasket seal or to open the cover. This prevents some bystander from loosening the seal, by merely turning the cover-sealing handle 35.

As previously explained, the interlocking mechanism 15 cooperates with the latching and sealing mechanism 14 to normally prevent closing the circuit interrupter unless the cover 17 is in the fully-closed position and sealed against the gasket. As shown in FIG. 2 the interlocking mechanism 15 comprises an interlocking member 65 which is pivotally mounted on the side of the cabinet 11 by means of a pin 66. The interlocking member 65 is biased in one direction by a spring 67 and is actuated in the other direction by the nose 62 of one of the cover latches 53 engaging a projection 68 on the member 65. The member 65 may also be actuated against the tension of the spring 67 by manually pressing on a projection 69 on the lever 65. A guide member 71 is attached to the side of the housing. The member 71 also functions as a stop member to limit the movement of the member 65 in the one direction.

As also shown in FIG. 2, an interlocking latch 72 is pivotally mounted on a pin 73. The latch 72 is biased in one direction by a spring 74 which is stretched between the projection 68 on the member 65 and a projection 75 on the latch 72. An arm 76 on the member 65 is disposed to engage a pin 77 on the latch 72 for a purpose which will be explained more fully hereinafter.

Figure 5:
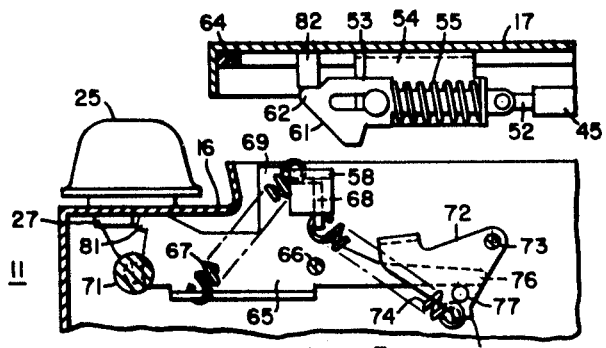
FIGS. 5, 6 and 7 are detail views of the interlocking mechanism.
Figure 6:
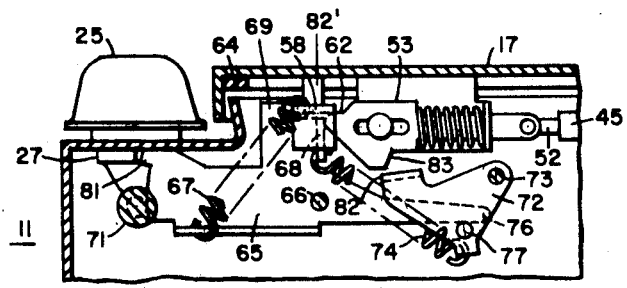
Figure 7:
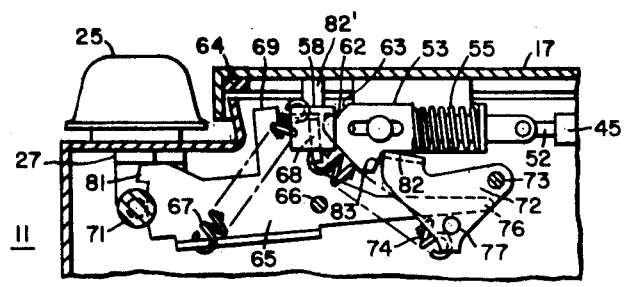

The operation of the interlocking mechanism may be more clearly understood by referring to FIGS. 5, 6 and 7. In FIG. 5 the cover 17 is shown open and the circuit interrupter is "off." The operating lever 27 permits the interlocking member 65 to rotate until it strikes the fixed portion 16 of the cover. A projection 81 on the interlocking member 65 will engage the lever 27 to prevent the interrupter from being closed. As the cover 17 is closed the latch 53 will strike the angle bracket 58 and be cammed to the right because of the sloping surface 61. A guide pin 82' on the cover will enter a hole 83' (FIG. 1) in the angle bracket 58, thereby ensuring proper positioning of the cover latch 53 with respect to the interlocking member 65, the interlocking latch 72 and the bracket 58.

In FIG. 6 the interrupter is "off" and the cover is closed far enough for the nose 62 of the latch 53 to engage underneath the bracket 58. The interlocking latch 72 is pivoted free of the cover latch 53 by the arm 76 of the interlocking member 65 engaging the pin 77 in the latch 72. The circuit interrupter is prevented from being closed by movement of the handle 25 because the projection 81 on the member 65 will engage the operating lever 27 attached to the handle 25 to prevent the handle from being rotated to close the interrupter. This prevents the interrupter from being closed by the handle 25 and insures that the cover must be fully closed with pressure against the gasket before the electrical equipment controlled by the interrupter can be energized and put into use. The cover latch 53 will not close completely to free the lever 27 from engagement by the projection 81 unless the cover latch 53 is forced to the fully-closed or cover-sealed position by means of the closing or sealing handle 35 in the manner previously described. The cover gasket 64 will then be compressed, and the handle 25 may be operated to close the interrupter.

Under special circumstances, a skilled electrician who understands the operation of the device, may find it desirable to close the interrupter 12 while the cover is open in order to make tests on the equipment. This may be done as shown in FIG. 7 where it is assumed that the interlocking member 65 has been manually moved downwardly by pressing on the projection 69 while the cover 17 is open, thereby lowering the projection 81 sufficiently to clear the end of the operating lever 27 permitting the circuit interrupter to be closed by operating the handle 25. After the interrupter has been closed and the tests or other work completed, the cover 17 may be partly closed as shown in FIG. 7. The projection 68 on the member 65 is moved counterclockwise about 66 sufficiently to permit the spring 55 to move the cover latch 53 underneath the bracket 58, thereby holding the cover 17 partly closed. The cover latch 53 is moved to the left by the spring 55 far enough to permit a projection 82 on the interlocking latch 72 to engage a shoulder 83 on the cover latch 53. Therefore, the cover 17 can not be opened without first opening the circuit interrupter, thereby disengaging the lever 27 from the projection 81 and permitting the spring 67 to return the interlocking member 65 to the position shown in FIG. 6. In this position the arm 76 on the member 65 engages the pin 77 to disengage the projection 82 from the shoulder 83. The cover 17 can now be opened by means of the screw 41 in the manner previously described. The position shown in FIG. 7 will also be obtained when the cover has been fully closed and an attempt has been made to open the cover with the interrupter closed.

It should be noted that the interlock cannot be defeated without first gaining access to the inside of the switch by opening the cover 17. This requires that the screw 41 be rotated by a tool other than the handle 35 and the method of opening the cover is not obvious to the ordinary workman. After the cover is open the method of defeating the interlock is not obvious since the end of the lever 27 and the projection 81 on the member 65 are obscured from view. Therefore, only someone who has been instructed knows that the interlock can be defeated by pressing on the projection 69 on the member 65. Thus, the ordinary workman is protected against injury by coming in contact with energized parts of a switch.

Referring again to FIG. 2 in which the cover 17 is shown in its fully-closed position, it will be noted that if the spring 74 is removed the interlocking latch 72 will pivot by gravity to permit the projection 82 to clear the shoulder 83 on the cover latch 53. The counterclockwise movement of the latch 72 is limited by the projection 82 engaging the arm 76. The pivot point 73 of the latch 72 is so located that the latch will swing counterclockwise with the cabinet mounted either vertically or horizontally. Thus, removal of the spring 74 removes the "on" interlock feature and the cover can be opened with the interrupter "on" or "off."

Figure 8:
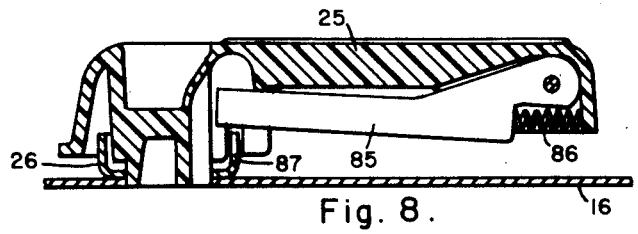
FIG. 8 is a detail view of the operating handle locking mechanism.

As shown in FIG. 8, a locking lever 85 is pivotally mounted in the handle 25 in order that the handle may be locked in the "off" position, thereby preventing the closing of the circuit breaker or switch. The lever 85 is normally biased to its uppermost postion by a compression spring 86. When the handle 25 is in the "off" position the lever 85 may be depressed into a slot 87 in a rim of the cup-shaped member 26 which is secured to the fixed portion of the cover 16. As shown in FIG. 1, a hasp of a padlock 88 may be installed around the handle 25 between the lever 85 and the handle to retain the lever in the slot 87. Thus, the handle may be locked in the "off" position to prevent closing the circuit interrupter regardless of the position of the cover 17.

As shown in FIGS. 1 and 2, one strap 91 of a hinge is secured to the cover 17. When the cover is closed the other strap 92 may be swung into position between the sides 36 of the cover closing and sealing handle 35. A knockout 93 is provided in one of the sides 36. If it is desired to lock the cover in the closed position the knockout 93 may be removed and a hasp of a padlock inserted in the knockout opening. As previously explained, the handle 35 is rotated by means of the screw 41 to release the cover latching mechanism and permit opening of the cover. Therefore, opening of the cover can be prevented by locking the hinge strap 92 between the sides 36 to prevent rotation of the handle 35.

Figure 9:
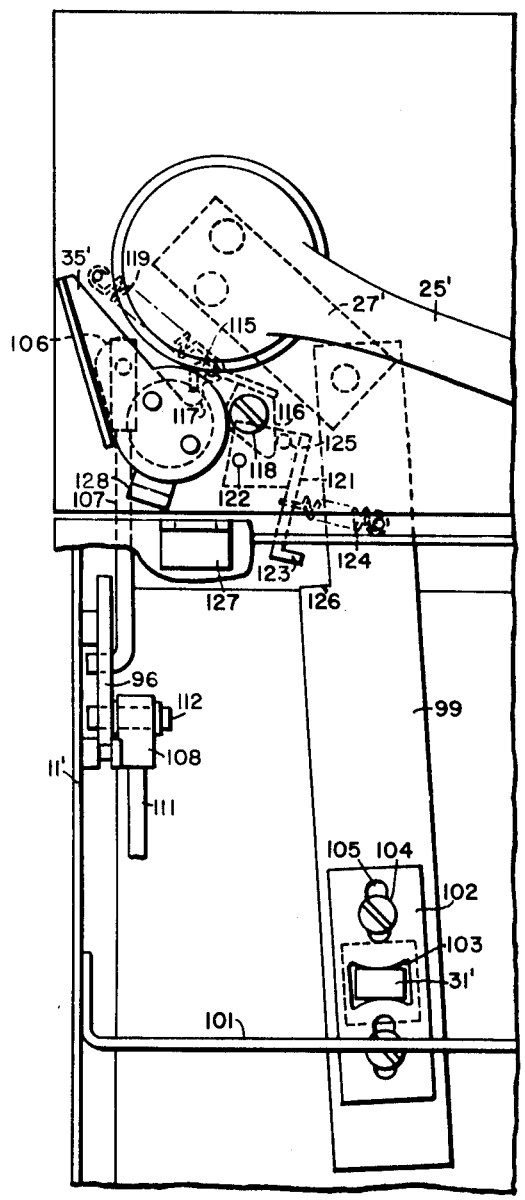
FIG. 9 is a view, in front elevation, of a modification of the invention.
Figure 10:
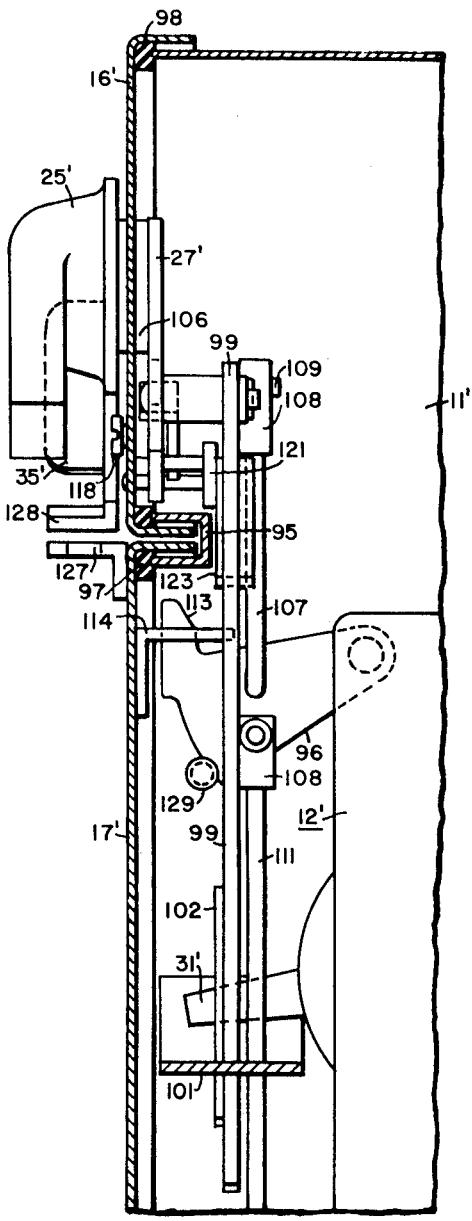
FIG. 10 is a view, partly in side elevation and partly in section, of the modification shown in FIG. 9.

In the modification of the invention shown in FIGS. 9 and 10 the cabinet 11' is divided by a channel 95 which extends horizontally across the cabinet and may be welded to opposite sides of the cabinet. A lower cover 17' is hinged on one side and fastened by cover latches 96 at the other side. The top or fixed portion 16' of the cover may be attached to the cabinet by bolts (not shown) which are accessible only from the interior of the cabinet when the cover 17' is open. Thus, the top cover 16' may be removed for the installation of conduit, but will remain bolted to the cabinet after initial installation. A sealing gasket 97 is provided around the edge of the cover 17' and a gasket 98 is provided around the edge of the cover 16'.

The external operating handle 25' is rotatably mounted on the fixed portion 16'. The operating lever 27' is continuously attached to the operating member 31' of the circuit interrupter 12' by means of an operating bar 99. A guide member 101 for the lower end of the bar 99 may be attached to the sides of the cabinet. A plate 102 having an opening 103 therein for receiving the operating member 31' is adjustably attached to the bar 99 by screws 104 which extend through slots 105 in the plate 102. The interrupter 12' is a circuit breaker which may be of the type described in the previously mentioned Patent No. 2,047,739.

In the present instance the cover-closing and sealing handle 35' is rotatably mounted on the fixed portion 16' of the cover. The cover closing latch 96 is pivotally mounted on the side of the cabinet 11'. The latch 96 is connected to a cam 106 by means of a pull rod 107. The cam 106 is driven by the handle 35'. As shown in FIG. 10 an adjustable nipple 108 is attached to the rod 107 and the nipple 108 is attached to the cam 106 by means of a spacing pin 109. As shown, an additional pull rod 111 may extend from the latch 96 to an additional latch (not shown). Thus, as many cover latches as desired may be provided. The pull rod 111 may be attached to the latch 96 by means of an adjustable nipple 108 and a pin 112.

When the handle 35' is rotated to pull the cover latch 96 upwardly, a sloping surface 113 on the cover latch engages a bracket 114 secured to the cover 17'. In this manner, the cover is forced to its fully-closed position, thereby compressing the gasket 97 and providing a good seal.

When the handle 35' is rotated sufficiently to fully close the cover a projection 115 on an interlocking catch 116 enters a depression 117 in the cam 106 to prevent the releasing of the cover latches 96 to permit opening the cover. The interlocking latch 116 is secured to a special screw 118 which is rotatably mounted in the cover 16' with the head of the screw accessible from the exterior of the cover. The projection 115 is biased into engagement with the cam 106 by a spring 119. If a skilled electrician desires to open the cover, the screw 118 may be rotated by means of a screwdriver or other suitable tool to disengage the latch 116 from the cam 106, thereby permitting the handle 35' to be rotated to release the cover latches. The ordinary workman would not know that this could be done, and would find that handle 35' could not be turned.

An additional interlocking latch 121 is provided to prevent closing the interrupter unless the cover 17' is in the fully-closed position. The latch 121 is pivotally mounted on a spacing pin 122. The latch 121 has a projection 123 which is biased toward the operating bar 99 by a spring 124. When the cover is fully closed the interlocking latch 116 engages a pin 125 in the latch 121 to move the projection 123 away from the bar 99, thereby permitting the interrupter to be closed by means of the external operating handle 25'. When the cover 17' is open the interlock can be deliberately voided by disengaging the projection 123 from the shoulder 126 on the operating bar 99 thereby permitting the interrupter to be closed.

The cover 17' may be locked in the closed position by inserting a padlock in a bracket 127 attached to the cover 17'. The padlock will engage a projection 128 on the handle 35' to prevent rotation of the handle to release the cover latching mechanism. It should be noted that the cover latches 96 are biased downwardly by gravity. The downward movement of the latch is limited by a combined guide and stop pin 129. However, the cover latching mechanism is retained in its fully-closed position by the projection 115 on the interlocking latch 116 engaging the cam 106 and once the cover is fully closed it can not be opened without releasing the interlock 116 by means of the screw 118.

Provision may be made for locking the external operating handle 25' by means of a padlock in the manner hereinbefore described. Thus, the circuit interrupter may be locked in either "off" or "on" position as desired.

From the foregoing description it is apparent that the present invention provides operating and interlocking mechanisms for enclosed circuit interrupters having the following safety features:

(1) The external operating handle is continuously connected to the operating member of the circuit interrupter regardless of the position of the door of the enclosure.

(2) The enclosure door may be easily closed and sealed by mechanical closing means.

(3) The circuit interrupter may be locked in the "off" position independently of the cover.

(4) The interrupter may be closed with the cover open by deliberately voiding the interlocking mechanism.

(5) A separate tool other than the cover closing handle is required for opening the cover.

(6) Interlocking is provided to prevent opening the door with the interrupter in the "on" position. If this interlocking feature is not desired, it may be easily removed.

(7) Provision is made for padlocking the cover closed if desired.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In combination, a circuit interrupter having movable operating member for opening and closing the interrupter, a cabinet in which the interrupter is mounted, said cabinet having a fixed front portion, an external operating handle extending from said fixed front portion for actuating said operating member, an openable cover for the cabinet, said operating handle being continuously connected to said operating member regardless of the position of the cover, a cover latching mechanism disposed inside the cabinet at least when said cover is closed, manually operable means movably mounted on the outside of the cabinet for actuating the latching mechanism to force the cover to its fully-closed position, and mechanical interlocking means cooperating with the latching mechanism to normally prevent closing the circuit interrupter unless the cover is fully closed.

2. In combination, a circuit interrupter having a movable operating member for opening and closing the interrupter, a cabinet in which the interrupter is mounted, said cabinet having a fixed front portion, an external operating handle movably mounted on said fixed front portion of the cabinet for actuating said operating member, an openable cover for the cabinet, said operating handle being continuously connected to said operating member regardless of the position of the cover, a cover latching mechanism disposed inside the cabinet at least when said cover is closed, a cover closing handle movably mounted on the outside of the cabinet for actuating the latching mechanism to force the cover to its fully-closed position regardless of the position of the external operating handle, and mechanical interlocking means cooperating with the latching mechanism to normally prevent closing of the circuit interrupter by means of the external operating handle unless the cover is fully closed, and means manually operable when said cover is open to defeat said interlocking means to permit closing of the circuit interrupter by means of the external operating handle.

3. In combination, a circuit interrupter having a movable operating member for opening and closing the interrupter, a cabinet in which the interrupter is mounted, said cabinet having a stationary front portion, an external operating handle extending from said stationary front portion for actuating said operating member, an openable cover for the cabinet, said operating handle being continuously connected to said operating member regardless of the position of the cover, a cover latching mechanism disposed inside the cabinet at least when said cover is closed, a cover closing handle movably mounted on the outside of the cabinet for actuating the latching mechanism to force the cover to its fully-closed position regardless of the position of the external operating handle, and a spring-biased interlocking member actuated by the latching mechanism to permit the circuit interrupter to be closed when the cover is fully closed by means of tehe cover closing handle.

4. In combination, a circuit interrupter having a movable operating member for opening and closing the interrupter, a cabinet in which the interrupter is mounted, said cabinet having a fixed front portion, an external operating handle extending from said fixed front portion for actuating said operating member, an openable cover for the cabinet, said operating handle being continuously connected to said operating member regardless of the position of the cover, a cover latching mechanism disposed inside the cabinet at least when said cover is closed, a cover closing handle movably mounted on the outside of the cabinet for actuating the latching mechanism to force the cover to its fully-closed position regardless of the position of the external operating handle, and a spring-biased interlocking member actuated by the latching mechanism to permit the circuit interrupter to be closed when the cover is fully closed by means of the cover closing handle, said interlocking member being manually releasable to permit the circuit interrupter to be closed when the cover is opened.

5. In combination, a circuit interrupter having a movable operating member for opening and closing the interrupter, a cabinet in which the interrupter is mounted, said cabinet having a fixed front portion, an external operating handle movably mounted on said fixed front portion for actuating said operating member, an openable cover for the cabinet, a cover latching mechanism disposed inside the cabinet, a cover closing handle movably mounted on the outside of the cabinet for actuating the latching mechanism to force the cover to its fully-closed position regardless of the position of the external operating handle, a spring-biased interlocking member actuated by the latching mechanism to permit the circuit interrupter to be closed when the cover is fully closed by means of the cover closing handle, and an interlocking latch cooperating with the interlocking member to prevent opening the cover while the circuit interrupter is closed.

6. In combination, a circuit interrupter having a movable operating member for opening and closing the interrupter, a cabinet in which the interrupter is mounted, said cabinet having a stationary front portion, an external operating handle movably mounted on said stationary front portion for actuating said operating member, an openable cover for the cabinet, a cover latching mechanism disposed inside the cabinet at least when said cover is closed, a cover closing handle rotatably mounted on the outside of the cabinet for actuating the latching mechanism to force the cover to its fully-closed position regardless of the position of the external operating handle, a spring-biased interlocking member actuated by the latching mechanism to permit the circuit interrupter to be closed when the cover is fully closed by means of the cover closing handle, and a spring-biased interlocking latch normally engaging the latching mechanism to prevent opening the cover while the circuit interrupter is closed, said latch being disengaged from the latching mechanism by the interlocking member when the circuit interrupter is opened.

7. In combination, a circuit interrupter having a movable operating member for opening and closing the interrupter, a cabinet in which the interrupter is mounted, said cabinet having a fixed front portion, an external operating handle extending from said fixed front portion for actuating said operating member, an openable cover for the cabinet, a cover latching mechanism, manually operable means separate from said operating handle and movably mounted on the outside of said cover for actuating the latching mechanism to force the cover to its fully-closed position, additional manually operable means accessible from the outside of the cabinet for releasing said latching mechanism to permit opening of the cover, and said latching mechanism being releasable only by the operation of said additional manually operable means.

8. In combination, a circuit interrupter having a movable operating member for opening and closing the interrupter, a cabinet in which the interrupter is mounted, said cabinet having a fixed front portion, an external operating handle extending from said fixed front portion for actuating said operating member, an openable cover positioned at the front of said cabinet, a cover latching mechanism, manually operable means separate from said operating handle and movably mounted on the outside of said cover for actuating the latching mechanism to force the cover to its fully-closed position, additional manually operable means accessible from outside of the cabinet for releasing said latching mechanism to permit opening of the cover, said latching mechanism being releasable only by operation of said additional manually operable means, and said additional manually operable means being operable only by means of a tool.

9. In combination, a circuit interrupter having a movable operating member for opening and closing the interrupter, a cabinet in which the interrupter is mounted, the front of said cabinet comprising a fixed portion and an openable cover, an external operating handle movably mounted on the fixed portion of the front of the cabinet for actuating said operating member, said operating handle being continuously connected to the operating member regardless of the position of the cover, a cover latching mechanism mounted on the inside of the cover at least when said cover is closed, a cover closing handle movably mounted on said cover for actuating the latching mechanism to force the cover to its fully-closed position, and mechanical interlocking means cooperating with the latching mechanism to normally prevent closing the circuit interrupter by means of the external operating handle unless the cover is fully closed by means of the cover closing handle.

10. In combination, a circuit interrupter having a movable operating member for opening and closing the interrupter, a cabinet in which the interrupter is mounted, the front of said cabinet comprising a fixed portion and an openable cover, an external operating handle movably mounted on the fixed portion of the front of the cabinet for actuating said operating member, said operating handle being continuously connected to the operating member regardless of the position of the cover, a cover latching mechanism mounted on the inside of the cabinet at least when said cover is closed, a cover closing handle structure movably mounted on the fixed portion of the front of the cabinet for actuating the latching mechanism to force the cover to its fully-closed position, and mechanical interlocking means engaging the cover closing handle structure to normally prevent closing the circuit interrupter by means of the external operating handle unless the cover is fully closed.

11. In combination, a circuit interrupter having a movable operating member for opening and closing the interrupter, a cabinet in which the interrupter is mounted, said cabinet having a fixed front portion, an openable cover disposed at the front of said cabinet, an external operating handle extending from said fixed front portion for actuating said operating member, a cover latching mechanism mounted on the inside of the cover, a cover closing handle separate from said operating handle and movably mounted on the outside of the cover for actuating the latching mechanism to force the cover to its fully-closed position regardless of the position of the external operating handle, cover releasing means connected to said cover closing handle by means of a lost-motion connection and operable only by means of a tool separate from the cover closing handle for releasing the latching mechanism to permit opening of the cover, and said latching mechanism being releasable only by operation of said cover releasing means.

12. In combination, a circuit interrupter having a movable operating member for opening and closing the interrupter, a cabinet in which the interrupter is mounted, said cabinet having a fixed front portion, an external operating handle extending from said fixed front portion for actuating said operating member, an openable cover for the cabinet, a cover latching mechanism, manually operable means separate from said operating handle and movably mounted on the outside of said cover for actuating the latching mechanism to force the cover to its fully-closed position, additional manually operable means accessible from the outside of the cabinet for releasing said latching mechanism to permit opening of the cover, said latching mechanism being releasable only by the operation of said additional manually operable means, and interlocking means cooperating with said latching mechanism to prevent closing of said circuit interrupter unless said cover is fully-closed.

13. In combination, a circuit interrupter having a movable operating member for opening and closing the interrupter, a cabinet in which the interrupter is mounted, said cabinet having a fixed front portion, an external operating handle extending from said fixed front portion for actuating said operating member, an openable cover disposed at the front of the cabinet, a cover latching mechanism, manually operable means separate from said operating handle and movably mounted on the outside of said cover for actuating the latching mechanism to force the cover to a fully-closed position, additional manually operable means accessible from the outside of the cabinet for releasing said latching mechanism to permit opening of the cover, said latching mechanism being releasable only by the operation of said additional manually operable means, and interlocking means cooperating with said cover latching mechanism to normally prevent a closing operation of said circuit interrupter unless said cover is fully-closed.

14. In combination, a circuit interrupter having a movable operating member for opening and closing the interrupter, a cabinet in which the interrupter is mounted, said cabinet having a fixed front portion, an external operating handle extending from said fixed front portion for actuating said operating member, an openable cover positioned at the front of said cabinet, a cover latching mechanism, manually operable means separate from said operating handle and movably mounted on the outside of said cover for actuating the latching mechanism to force the cover to a fully-closed position, additional manually operable means accessible from outside of the cabinet for releasing said latching mechanism to permit opening of the cover, said latching mechanism being releasable only by the operation of said additional manually operable means, said additional manually operable means being operable only by means of a tool, and interlocking means cooperating with said cover latching mechanism to normally prevent closing of said circuit interrupter unless said cover is fully-closed.

15. In combination, a circuit interrupter having a movable operating member for opening and closing the interrupter, a cabinet in which the interrupter is mounted, said cabinet having a fixed front portion, an external operating handle extending from said fixed front portion for actuating said operating member, an openable cover positioned at the front of the cabinet, a cover latching mechanism, manually operable means separate from said operating handle and movably mounted on the outside of said cover for actuating the latching mechanism to force the cover to its fully-closed position, additional manually operable means accessible from the outside of the cabinet for releasing said latching mechanism to permit opening of the cover, said latching mechanism being releasable only by the operation of said additional manually operable means, interlocking means cooperating with said cover latching mechanism to normally prevent closing of said circuit interrupter unless said cover is fully-closed, and means for defeating said interlocking means when said cover is open to permit closing of said circuit interrupter.

16. In combination, a circuit interrupter having a movable operating member for opening and closing the interrupter, a cabinet in which the interrupter is mounted, said cabinet having a fixed front portion, an external operating handle extending from said fixed front portion for actuating said operating member, an openable cover positioned at the front of said cabinet, a cover latching mechanism, manually operable means separate from said operating handle and movably mounted on the outside of said cover for actuating the latching mechanism to force the cover to its fully-closed position, additional manually operable means accessible from outside of the cabinet for releasing said latching mechanism to permit opening of the cover, said latching mechanism being releasable only by operation of said additional manually operable means, and said additional manually operable means being operable only by means of a tool, interlocking means cooperating with said cover latching mechanism to normally prevent a closing operation of said circuit interrupter unless said cover is fully-closed, and means for defeating said interlocking means when said cover is open to permit a closing operation of said circuit interrupter.

References Cited in the file of this patent

UNITED STATES PATENTS

| | | |
|---|---|---|
| 1,292,808 | Krantz | Jan. 28, 1919 |
| 1,324,909 | Krantz | Dec. 16, 1919 |
| 1,420,111 | Krantz | June 20, 1922 |
| 1,812,896 | Olley | July 7, 1931 |
| 2,020,913 | Schramm | Nov. 12, 1935 |
| 2,191,523 | Ellis | Feb. 27, 1940 |
| 2,319,084 | Olofson | May 11, 1943 |
| 2,325,697 | Millenmaster et al. | Aug. 3, 1943 |
| 2,361,535 | Evans | Oct. 31, 1944 |
| 2,404,183 | Landmeier | July 16, 1946 |
| 2,412,494 | Cole | Dec. 10, 1946 |
| 2,574,745 | Langley | Nov. 13, 1951 |
| 2,645,688 | De Smidt et al. | July 14, 1953 |
| 2,674,666 | Stieglitz | Apr. 6, 1954 |
| 2,695,934 | Wills | Nov. 30, 1954 |
| 2,759,054 | Goudy et al. | Aug. 14, 1956 |
| 2,907,840 | Cole | Oct. 6, 1959 |
| 2,946,865 | Thomas | July 26, 1960 |